Patented July 8, 1941

2,248,107

UNITED STATES PATENT OFFICE 2,248,107

POLYMERIZATION OF BUTADIENES

Kurt Meisenburg, Leverkusen - I. G. Werk, Ingofroh Dennstedt, Cologne-Buchforst, and Ewald Zaucker, Cologne-Mulheim - on - the-Rhine, Germany, assignors, by mesne assignments, to Jasco, Incorporated, a corporation of Louisiana No Drawing. Application February 28, 1938, Serial No. 193,060. In Germany March 2, 1937

8 Claims. (Cl. 260—32)

The present invention relates to a new process of polymerizing butadienes-1.3 and to the new polymerizates which are obtainable thereby.

It is known that the polymerization of butadienes-1.3 easily results in the formation of products which are insoluble in benzene and resemble vulcanized rubber rather than the unvulcanized product. In consequence thereof, the working of these products on the roller and the incorporation therewith of filling materials and the ingredients which are necessary for effecting vulcanization is connected with considerable difficulties. Moreover, the mechanical properties of the vulcanizates obtained from such products are materially impaired when compared with those vulcanizates obtained from benzene soluble polymerizates. In order to avoid these disadvantages it has been proposed to effect the heat polymerization of butadienes-1.3 in the presence of sulfur or certain sulfur containing compounds. It is not disputed that certain improvements are obtained thereby; however, by the use of these additions the disadvantage is involved that the course of the polymerization is considerably retarded; moreover, the presence of sulfur and the said sulfur containing compounds may result in the formation of undesired dimeric by-products.

It is the object of the present invention to do away with these disadvantages and to develop a new process which allows one to polymerize butadienes-1.3 in a nearly quantitative yield without retarding the course of the reaction and without involving the formation of products which are insoluble in benzene or of dimeric products. Other objects of our invention will be apparent from the following description and claims.

It has been found that organic sulfur containing compounds which are soluble in the monomeric substances to be polymerized exert a remarkable regulating effect upon the course of the emulsion polymerization. Those sulfur containing products are preferred which contain at least 2 sulfur atoms directly connected with each other, i. e. organic disulfides. Examples for suitable regulators are dialkylxanthogendisulfides, di (benzoic acid ester) tetra sulfides, tolyldisulfide and tolyltrisulfide. In most cases an amount of less than 1% of these regulators (calculated on the amount of monomeric products) is sufficient to exert the desired effect; in other cases somewhat higher amounts are required. Depending on the amount of the regulators the resulting polymerizates either resemble natural rubber or are of a more plastic nature, the yield and solubility in organic solvents such as benzene being excellent regardless of the amount of such regulators. In this respect our new process is superior to the hitherto employed heat polymerization in the presence of sulfur and sulfur containing compounds, since in the latter case the amount of the regulators must be carefully controlled if a good yield is to be combined with a good solubility of the polymerizates.

The new process can be applied to every polymerizable butadiene-1.3, the latter term being intended to comprise the unsubstituted butadiene as well as the homologues thereof such as isoprene. As a matter of fact, also mixtures of such butadienes with other polymerizable compounds such as styrene or acrylic acid nitrile can be employed. It is to be understood that such sulfur containing regulators are preferred, as have only a weak vulcanizing effect or no such effect at all.

The following examples illustrate the present invention without, however, restricting it thereto the parts being by weight:

Example 0.5 part of diisopropylxanthogendisulfide dissolved in 69 parts of butadiene are emulsified in 200 parts of a 5% sodium oleate solution containing 0.3 part of ammonium persulfate. After a several days' shaking a soluble plastic polymerizate is obtained in a quantitative yield.

Example 2

0.1 part of diisopropylxanthogendisulfide dissolved in 52 parts of butadiene and 22 parts styrene are emulsified in 200 parts of a 5% sodium oleate solution containing 0.3 part of ammonium persulfate. After a several days' shaking at 30° and upon coagulation there is obtained in a nearly quantitative yield an easily soluble mixed polymerizate which shows excellent mechanical properties.

Example 3

75 parts of butadiene and 25 parts of styrene are emulsified in 142 parts of water having dissolved therein 3 parts of sodium diisobutyl naphthalene sulfonate, 0.2 part of sodium hydroxide and 0.375 part of potassium persulfate. Polymerization is effected by a 5 to 6 hours' shaking at 30°. The following table shows the yield of soluble polymerizates obtained under the influence of varying amounts of tolyldisulfide as regulator:

| Amount of regulator in percent of polymerizable substances | Yield of soluble polymerizates in percent of the theoretical amount |
| --- | --- |
| 3 | 91 |
| 4 | 92 |
| 5 | 92 |

We claim:

1. The process which comprises effecting the emulsion polymerization of butadiene 1.3 hydrocarbons in the presence of such organic sulfur-containing compounds as contain at least 2 sulfur atoms directly connected with each other and are soluble in the monomeric substances to be polymerized, said compounds being selected from the group consisting of dialkylxanthogendisulfides, di(benzoic acid ester)-tetrasulfides, tolyldisulfide and tolyltrisulfide.

2. The process which comprises effecting the emulsion polymerization of butadiene-1.3 hydrocarbons in the presence of dialkylxanthogendisulfides.

3. The process which comprises effecting the emulsion polymerization of butadiene-1.3 hydrocarbons in the presence of diisobutylxanthogendisulfide.

4. The process which comprises effecting the emulsion polymerization of butadiene-1.3 hydrocarbons in the presence of di(benzoic acid ester)-tetrasulfides.

5. The process as claimed in claim 1 wherein mixtures of butadiene-1.3 hydrocarbons with other co-polymerizable compounds are employed.

6. The process which comprises subjecting butadiene 1.3 to a conjoint emulsion polymerization with styrene in the presence of such organic sulfur-containing compounds as contain at least 2 sulfur atoms directly connected with each other and are soluble in the monomeric substances to be polymerized, said compounds being selected from the group consisting of dialkylxanthogendisulfides, di(benzoic acid ester)-tetrasulfides, tolyldisulfide and tolyltrisulfide.

7. The process which comprises subjecting butadiene-1.3 to a conjoint emulsion polymerization with styrene in the presence of dialkylxanthogendisulfides.

8. The process which comprises subjecting butadiene 1.3 to a conjoint emulsion polymerization with acrylic acid nitrile in the presence of such organic sulfur-containing compounds as contain at least 2 sulfur atoms directly connected with each other and are soluble in the monomeric substances to be polymerized, said compounds being selected from the group consisting of dialkylxanthogen-disulfides, di(benzoic acid ester)-tetrasulfides tolyldisulfide and tolyltrisulfide.

KURT MEISENBURG.
INGOFROH DENNSTEDT
EWALD ZAUCKER.